(12) United States Patent
Mizuno et al.

(10) Patent No.: US 7,027,297 B1
(45) Date of Patent: Apr. 11, 2006

(54) ELECTRONIC APPARATUS AND HINGE UNIT

(75) Inventors: Yusuke Mizuno, Kawasaki (JP); Sonomasa Kobayashi, Kawasaki (JP); Kaigo Tanaka, Kawasaki (JP); Yukihiro Ueki, Tokyo (JP); Minoru Suzuki, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/191,936

(22) Filed: Jul. 29, 2005

(30) Foreign Application Priority Data

Mar. 28, 2005 (JP) .............................. 2005-092786

(51) Int. Cl.
*G06F 1/16* (2006.01)

(52) U.S. Cl. ........................................ 361/683; 16/337

(58) Field of Classification Search ................ 361/683, 361/679, 686; 16/337
See application file for complete search history.

(56) References Cited

U.S. PATENT DOCUMENTS

| | | | | |
|---|---|---|---|---|
| 6,108,195 A | * | 8/2000 | Behl et al. ................... | 361/681 |
| 6,275,376 B1 | * | 8/2001 | Moon ........................... | 361/683 |
| 6,587,333 B1 | * | 7/2003 | Tseng et al. ................. | 361/681 |
| 6,742,221 B1 | * | 6/2004 | Lu et al. ....................... | 16/367 |
| 6,781,819 B1 | * | 8/2004 | Yang et al. ................... | 361/680 |
| 6,850,407 B1 | * | 2/2005 | Tanimoto et al. ........... | 361/681 |
| 6,867,961 B1 | * | 3/2005 | Choi ............................ | 361/681 |
| 2005/0207104 A1 | * | 9/2005 | Love ............................ | 361/683 |

FOREIGN PATENT DOCUMENTS

JP          5-40566      6/1993

* cited by examiner

*Primary Examiner*—Lisa Lea-Edmonds
(74) *Attorney, Agent, or Firm*—Staas & Halsey LLP

(57) ABSTRACT

A support member is incorporated in a first enclosure. A rotating member is supported on the support member for relative rotation around a first rotation axis. A second enclosure is coupled to the rotating member for relative rotation around a second rotation axis extending along a plane perpendicular to the first rotation axis. A hinge cap having a predetermined elasticity covers over the rotating member. A protrusion formed on the hinge cap is engaged with the rotating member based on the elasticity of the hinge cap. When the second enclosure is folded over the first enclosure, either the front or back surface of the second enclosure can be received on the front surface of the first enclosure. Even if the user carries the electronic apparatus, the hinge cap is reliably prevented from rattling. Generation of noise can be avoided.

4 Claims, 7 Drawing Sheets

ELECTRONIC APPARATUS AND HINGE UNIT

BACKGROUND OF THE INVENTION

1. Field of the Invention

The present invention relates to an electronic apparatus such as a notebook personal computer, for example. In particular, the invention relates to an electronic apparatus including a first enclosure and a second enclosure capable of rotating relative to the first enclosure around a first rotation axis and a second rotation axis defined within a plane set perpendicular to the first rotation axis.

2. Description of the Prior Art

A notebook personal computer includes a main body enclosure and a display enclosure. A keyboard is exposed on the surface of the main body enclosure. A liquid crystal display (LCD) panel is exposed on the surface of the display enclosure. The display enclosure is coupled to the main body enclosure through a swivel mechanism. The swivel mechanism realizes the rotation of the display enclosure around a horizontal axis relative to the main body enclosure. The display enclosure is in this manner folded over the main body enclosure through the rotation around the horizontal axis.

The swivel mechanism also realizes the rotation of the display enclosure relative to the main body enclosure around a vertical axis defined within a plane set perpendicular to the horizontal axis. The horizontal axis is in this manner allowed to rotate around the vertical axis. When the display enclosure is folded over the main body enclosure, either the front or back surface of the display enclosure can be received on the front surface of the main body enclosure.

The main body enclosure includes a base and a cover coupled to the base. The swivel mechanism is fixed on the base. The swivel mechanism protrudes out of an opening defined in the cover. The swivel mechanism is covered with a hinge cap likewise protruding out of the opening. A flange is formed at the lower end of the hinge cap. The flange serves to prevent the hinge cap from dropping out of the main body enclosure. Wires penetrate through the swivel mechanism between the main body enclosure and the display enclosure.

The hinge cap is loosely received in the opening. The hinge cap thus tends to jounce in the opening when the user carries the notebook personal computer, for example. The flange of the hinge cap collides against the enclosure. The hinge cap accordingly rattles. The noise sometimes annoys the user of the notebook personal computer.

The wires are passed through the swivel mechanism during the production of the notebook personal computer. The swivel mechanism is covered with the hinge cap. The elasticity of the wires pushes up the hinge cap, for example. The hinge cap is thus lifted up from the swivel mechanism. The cover is then coupled to the base. The hinge cap should be received in the opening of the cover. Since the hinge cap is lifted up from the swivel mechanism in the aforementioned manner, the worker must hold the hinge cap against the swivel mechanism during the attachment of the cover. The notebook personal computer cannot be assembled in an efficient manner.

SUMMARY OF THE INVENTION

It is accordingly an object of the present invention to provide an electronic apparatus reliably preventing the hinge unit from rattling. It is an object of the present invention to provide an electronic apparatus and a hinge unit contributing to efficient assembling.

According to the present invention, there is provided a An electronic apparatus comprising: a first enclosure; a support member incorporated in the first enclosure; a rotating member supported on the support member for relative rotation around a first rotation axis, said rotating member protruding out of an opening defined in the first enclosure; a second enclosure coupled to the rotating member for relative rotation around a second rotation axis extending along a plane perpendicular to the first rotation axis; a hinge cap protruding out of the opening so as to cover over the rotating member, said hinge cap having a predetermined elasticity; and a protrusion formed on the hinge cap and engaged with the rotating member based on the elasticity of the hinge cap.

The rotating member enables rotation of the second enclosure relative to the first enclosure around the first rotation axis in the electronic apparatus. The second enclosure is also allowed to rotate around a second rotation axis on the first enclosure. When the second enclosure is folded over the first enclosure, either the front or back surface of the second enclosure can be received on the front surface of the first enclosure. The electronic apparatus allows the protrusion of the hinge cap to get engaged with the rotating member based on the elasticity of the hinge cap. Even if the user carries the electronic apparatus, for example, the hinge cap is reliably prevented from rattling. Generation of noise can be avoided.

In addition, the hinge cap is steady held on the rotating member based on the elasticity of the hinge cap. When the electronic apparatus is to be assembled, the hinge cap is reliably prevented from dropping off from the rotating member. The electronic apparatus can be assembled in an efficient manner. Moreover, the elasticity of the hinge cap enables attachment and detachment of the hinge cap to and from the rotating member. Repair can be effected on the electronic apparatus after a facilitated removal of the hinge cap from the rotating member, for example.

The electronic apparatus may further comprise: a through hole penetrating through the rotating member along the first rotation axis; and a wire located within the through hole, said wire extending from the first enclosure to the second enclosure. The wires are located within the through hole extending from the first enclosure to the second enclosure. The rotating member is covered with the hinge cap. The hinge cap is steady engaged with the rotating member based on the protrusion. For example, even if the wire exhibits a driving force to lift the hinge cap along the first rotation axis, the hinge cap is reliably kept on the rotating member. The hinge cap is reliably prevented from being lifted up. The electronic apparatus can thus be assembled in an efficient manner.

A specific hinge unit may be provided to realize the aforementioned electronic apparatus. The hinge unit may comprise: a support member incorporated within a first enclosure of an electronic apparatus; a rotating member supported on the support member for relative rotation around a first rotation axis and protruding out of an opening defined in the first enclosure, said rotating member receiving a second enclosure of the electronic apparatus for relative rotation around a second rotation axis extending along a plane perpendicular to the first rotation axis; a hinge cap protruding out of the opening for covering the rotating member, said hinge cap having a predetermined elasticity; and a protrusion formed on the hinge cap and engaged with the rotating member based on the elasticity of the hinge cap.

When the hinge unit of the type is utilized in the electronic apparatus, the hinge cap is reliably prevented from rattling in the above-described manner. The electronic apparatus can thus be assembled in an efficient manner.

The rotating member may include a through hole penetrating through the rotating member along the first rotation axis, said through hole receiving insertion of a wire extending from the first enclosure to the second enclosure. When the hinge unit of the type is utilized in the electronic apparatus, the hinge cap is reliably held on the rotating member even if the wire exhibits a driving force to lift up the hinge cap in the aforementioned manner. The electronic apparatus can thus be assembled in an efficient manner.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
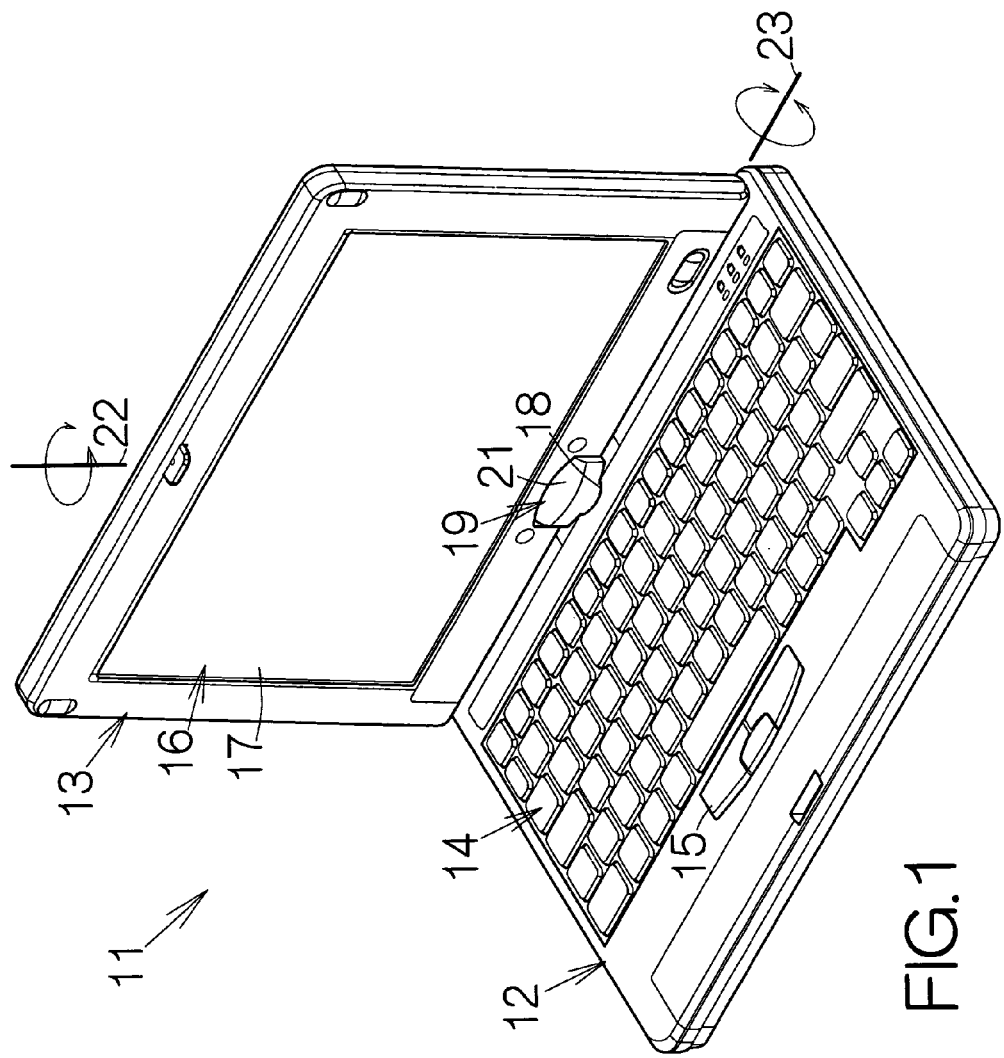
FIG. 1 is a perspective view schematically illustrating the structure of a notebook personal computer as a specific example of an electronic apparatus according to an embodiment of the present invention.

FIG. 1 schematically illustrates a notebook personal computer 11 as a specific example of an electronic apparatus according to an embodiment of the present invention. The notebook personal computer 11 includes a first enclosure or main body enclosure 12 and a second enclosure or display enclosure 13 coupled to the main body enclosure 12. The main body enclosure 12 and the display enclosure 13 may be made of a reinforced resin material such as polycarbonate, for example.

A motherboard is enclosed within the main body enclosure 12. Electronic circuit elements such as a central processing unit, CPU, a memory unit, and the like, are mounted on the motherboard. The central processing unit is designed to execute various processing or calculation based on software programs and/or data temporarily stored in the memory unit, for example. The software programs and data may be stored in a mass storage such as a hard disk drive, HDD, enclosed within the main body enclosure 12.

Input devices such as a keyboard 14, a pointing device 15, and the like, are located on the front surface of the main body enclosure 12. The keyboard 14 includes keypads arranged on an imaginary plane. The user utilizes the input devices 14, 15 so as to input various instructions and data to the central processing unit.

A flat display panel such as a liquid crystal display (LCD) panel 16, for example, is incorporated in the display enclosure 13. The screen of the LCD panel 16 is exposed on the front surface of the display enclosure 13. Various texts and/or graphics can be displayed on the screen of the LCD panel 16 in response to the operation of the central processing unit.

An input device such as a touch screen panel 17 is placed on the front surface of the LCD panel 16. The user is allowed to manipulate the touch screen panel 17 with a stylus, a finger of the user, or the like, so as to input various instructions and data to the central processing unit.

A bi-axial swivel mechanism 19 is employed to couple the display enclosure 13 with the main body enclosure 12. The swivel mechanism 19 partially protrudes out of an opening 18 defined on the front surface of the main body enclosure 12. The swivel mechanism 19 is covered with a hinge cap 21 likewise protruding out of the opening 18. The hinge cap 21 may be made of a resin material, for example. Molding process may be employed to form the hinge cap 21, for example.

The swivel mechanism 19 realizes the rotation of the display enclosure 13, relative to the main body enclosure 12, not only around a first rotation axis or vertical axis 22 but also around a second rotation axis or horizontal axis 23. The vertical axis 22 is set perpendicular to the front surface of the main body enclosure 12. The horizontal axis 23 extends along a plane set perpendicular to the vertical axis 22. The swivel mechanism 19 and the hinge cap 21 comprise a hinge unit of the present invention.

Figure 2:
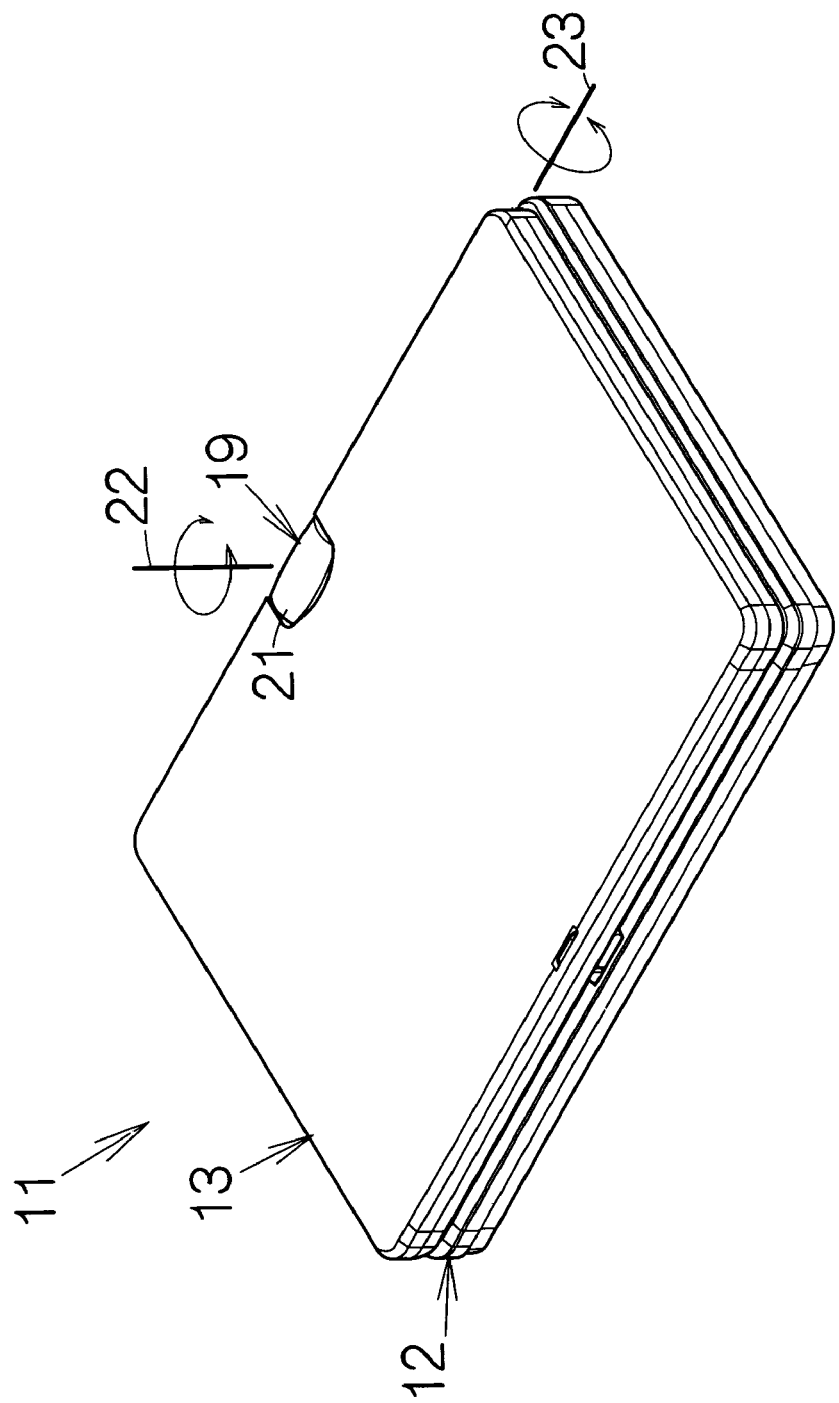
FIG. 2 is a perspective view of the notebook personal computer for schematically illustrating the display enclosure folded over the upper surface of the main body enclosure with the front surface of the display enclosure received on the front surface of the main body enclosure.

Now, assume that the front surface of the display enclosure 13 is received on the front surface of the main body enclosure 12 through the rotation of the display enclosure 13 around the horizontal axis 23. As shown in FIG. 1, the display enclosure 13 takes a first upright attitude through the rotation around the vertical axis 22. As shown in FIG. 2, the display enclosure 13 taking the first upright attitude is allowed to rotate around the horizontal axis 23, so that the display enclosure 13 is folded over the main body enclosure 12. The front surface of the display enclosure 13 or the screen of the LCD panel 16 is opposed to the front surface of the main body enclosure 12. The outline of the display enclosure 13 is homologized with the outline of the main body enclosure 12. The notebook personal computer 11 can be folded in this manner.

Figure 3:
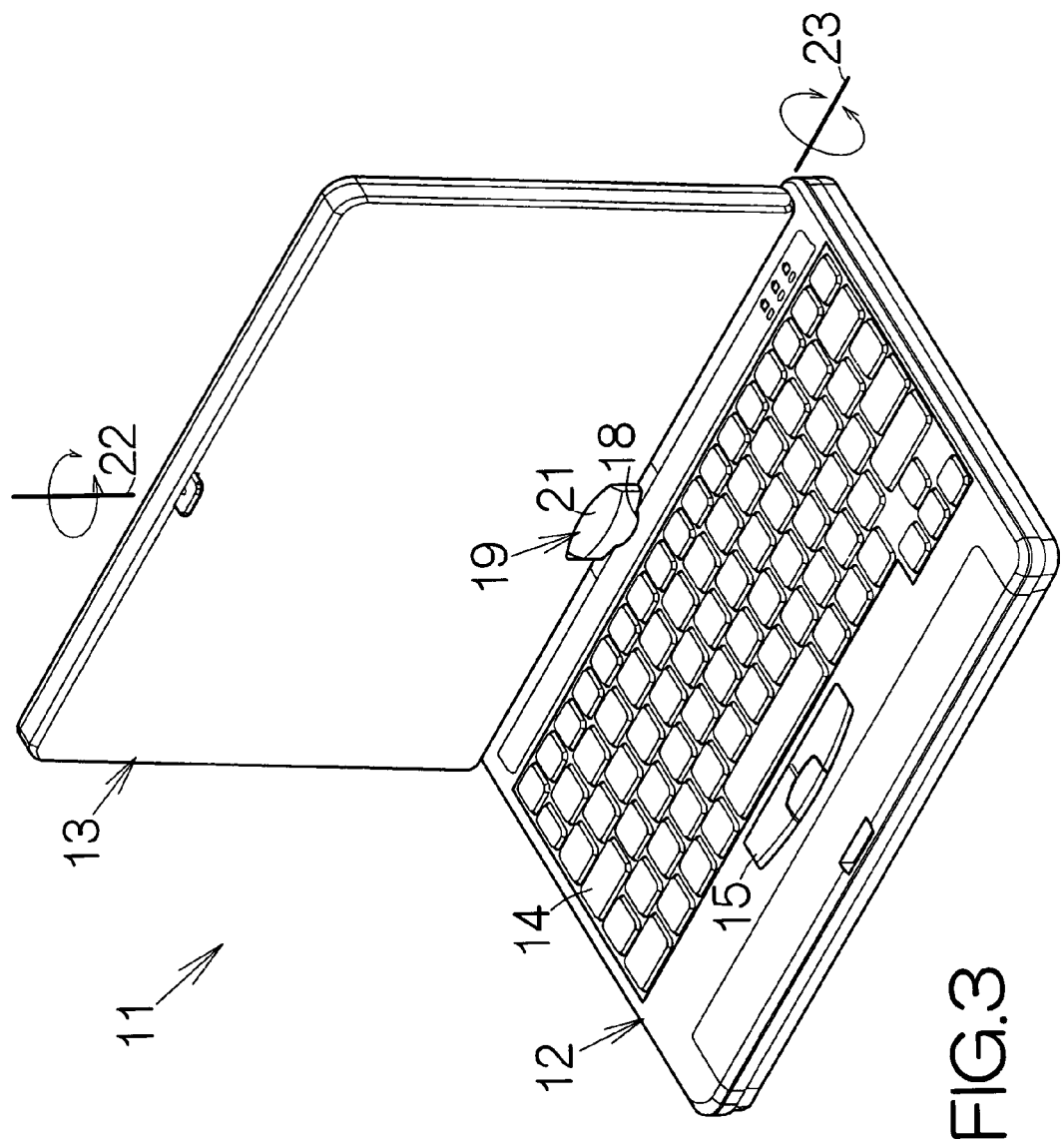
FIG. 3 is a perspective view of the notebook personal computer for schematically illustrating the display enclosure establishing a second upright attitude around the vertical axis.
Figure 4:
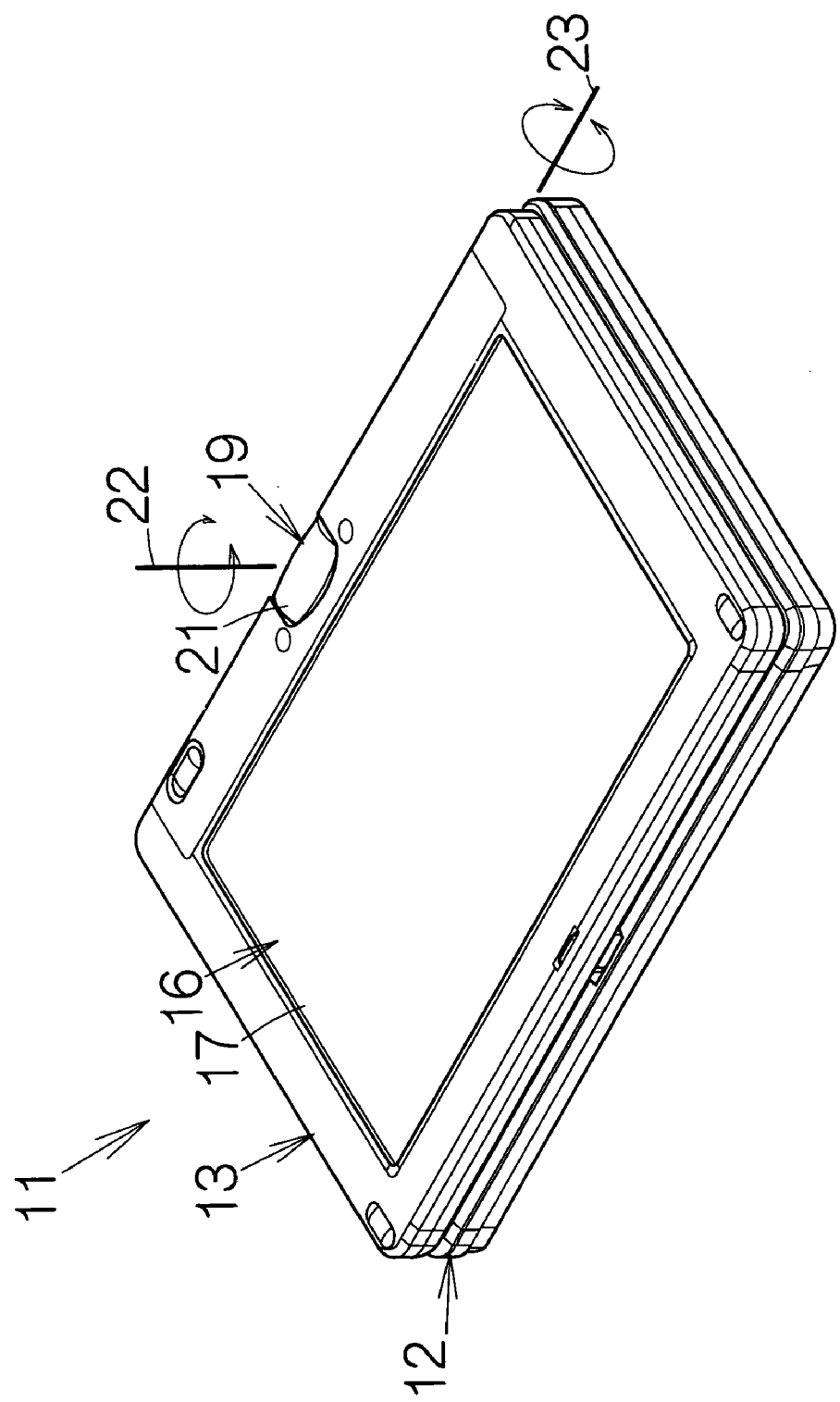
FIG. 4 is a perspective view of the notebook personal computer for schematically illustrating the display enclosure folded over the main body enclosure with the back surface of the display enclosure received on the front surface of the main body enclosure.

As shown in FIG. 3, the display enclosure 13 is allowed to rotate around the vertical axis 22 over 180 degrees relative to the main body enclosure 12, for example. The display enclosure 13 thus takes a second upright attitude through the rotation around the vertical axis 22. As shown in FIG. 4, the display enclosure 13 taking the second upright attitude is allowed to rotate around the horizontal axis 23, so that the display enclosure 13 is folded over the main body enclosure 12. In this case, the back surface of the display enclosure 13 is opposed to the front surface of the main body enclosure 12. The notebook personal computer 11 can in this manner be folded with the display enclosure 13 reversed.

Figure 5:
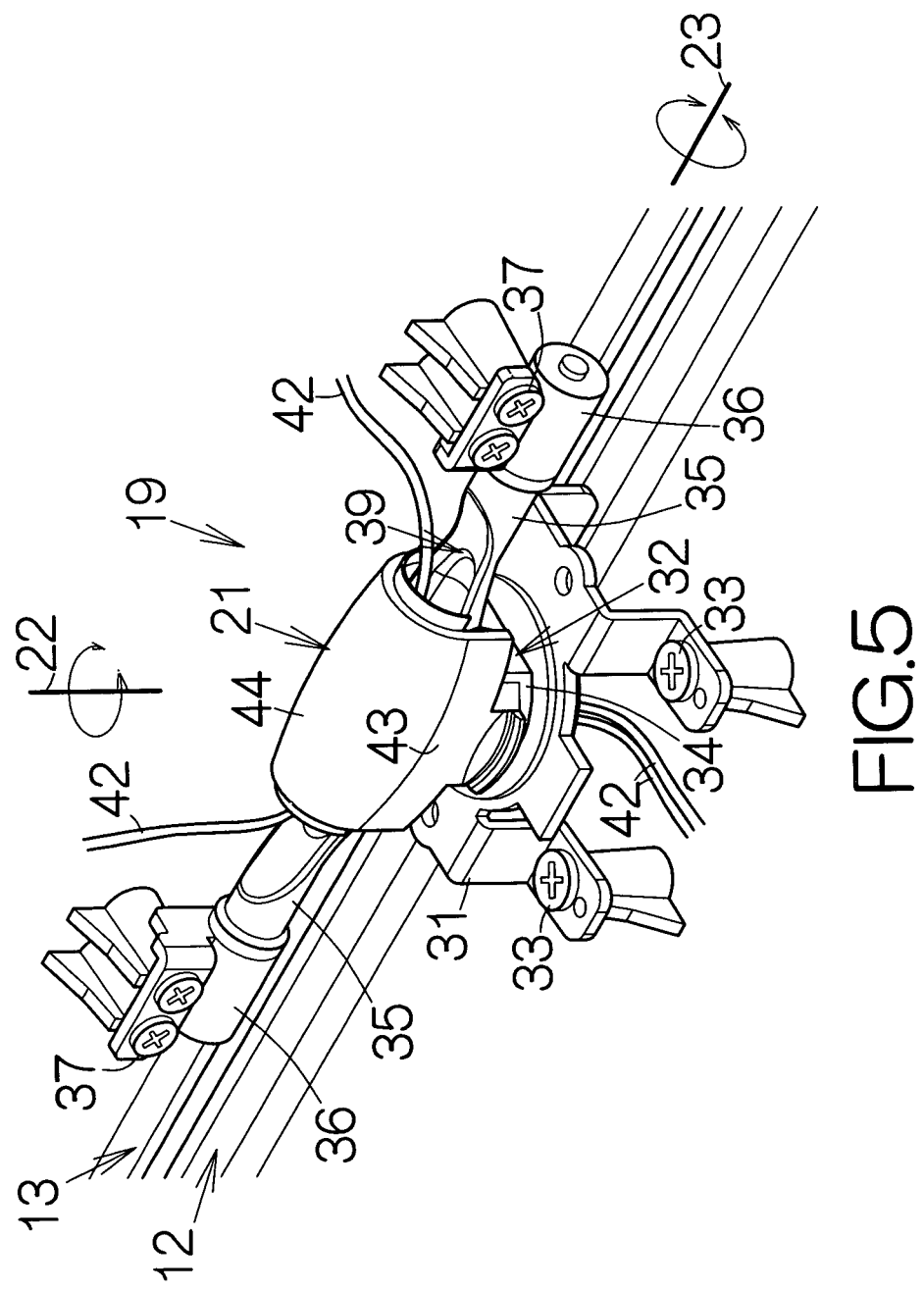
FIG. 5 is an enlarged partial perspective view of the notebook personal computer for schematically illustrating the structure of a swivel mechanism.

As shown in FIG. 5, the swivel mechanism 19 includes an attachment member 31 incorporated within the main body enclosure 12. A rotating member 32 is supported on the attachment member 31 for relative rotation around the vertical axis 22. The attachment member 31 is fixed on the inner surface of the main body enclosure 12, for example. Screws 33 are employed to fix the attachment member 31 to the main body enclosure 12, for example. The screws 33 may be received in bosses standing upright from the upward bottom surface of the main body enclosure 12. The rotating member 32 is covered with the aforementioned hinge cap 21.

The rotating member 32 includes a main body 34 and a pair of arm 35, 35 extending from the main body 34 in opposite directions. Rotating pieces 36, 36 are coupled to the tip ends of arms 35, 35, respectively, for relative rotation around the horizontal axis 23. The rotating pieces 36 are coupled to the inside surface of the display enclosure 13. Screws 37 are employed to fix the rotating pieces 36 to the display enclosure 13, for example. The screws 37 may be received in bosses standing upright from the inside surface of the display enclosure 13. Here, the rotating member 32 may be made of a metallic material such as a stainless steel, for example. Casting process may be utilized to form the rotating member 32.

Figure 6:
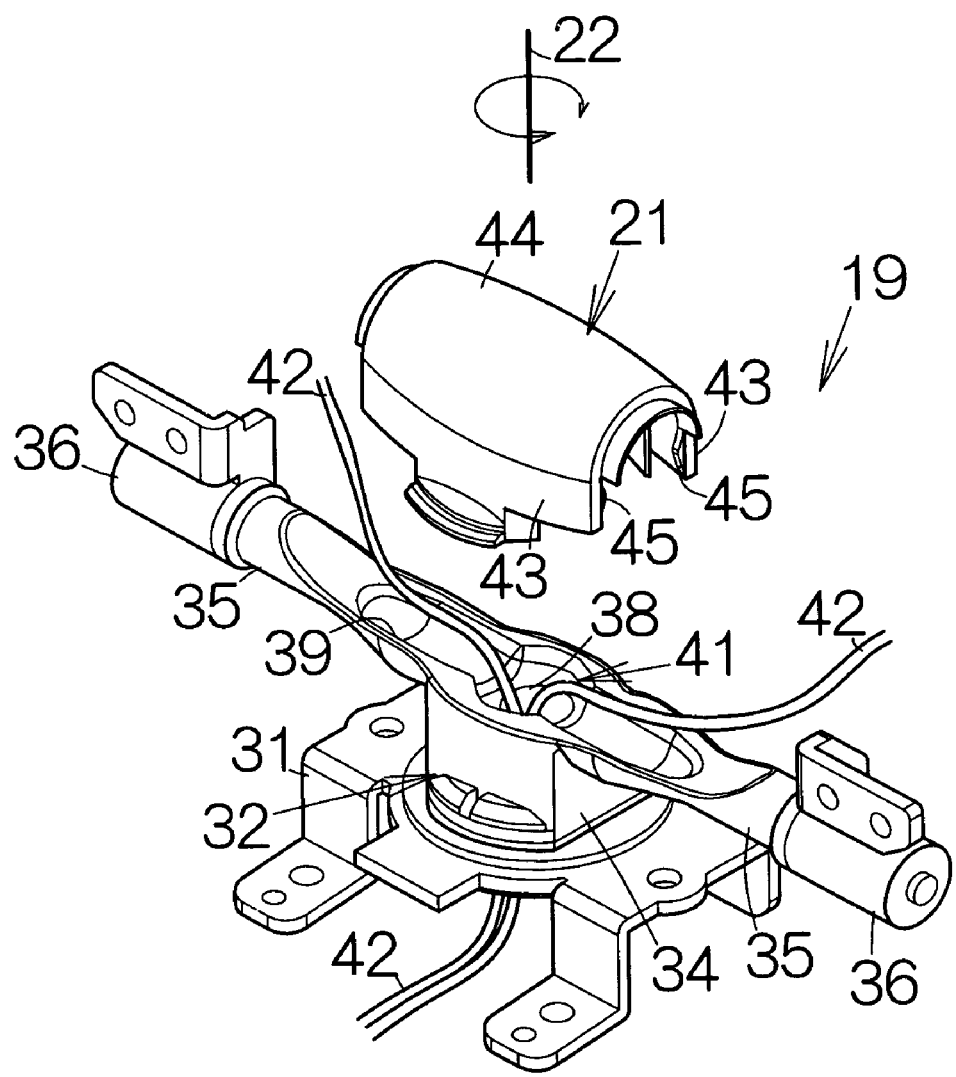
FIG. 6 is an enlarged partial perspective view schematically illustrating the structure of the swivel mechanism.

As shown in FIG. 6, a through hole 38 is formed in the main body 34 of the rotating member 32. The through hole 38 penetrates through the rotating member 32 along the vertical axis 22. A depression 39 is formed in the rotating member 32 at the upper end of the through hole 38. The depression 39 extends from one of the arms 35 to the other of the arms 35. A hollow space 41 is defined between the depression 39 and the hinge cap 21. The hollow space 41 extends from the upper end of the vertical through hole 38 in the horizontal direction. The hollow space 41 is opened into a space within the display enclosure 13 at locations on the arms 35. The hollow space 41 is also opened at the lower end thereof into a space within the main body enclosure 12 through the through hole 38. Wires 42 are disposed inside the through hole 38 and the hollow space 41. The wires 42 extends through the through hole 38 and the hollow space 41 between spaced within the main body enclosure 12 and the display enclosure 13.

Figure 7:
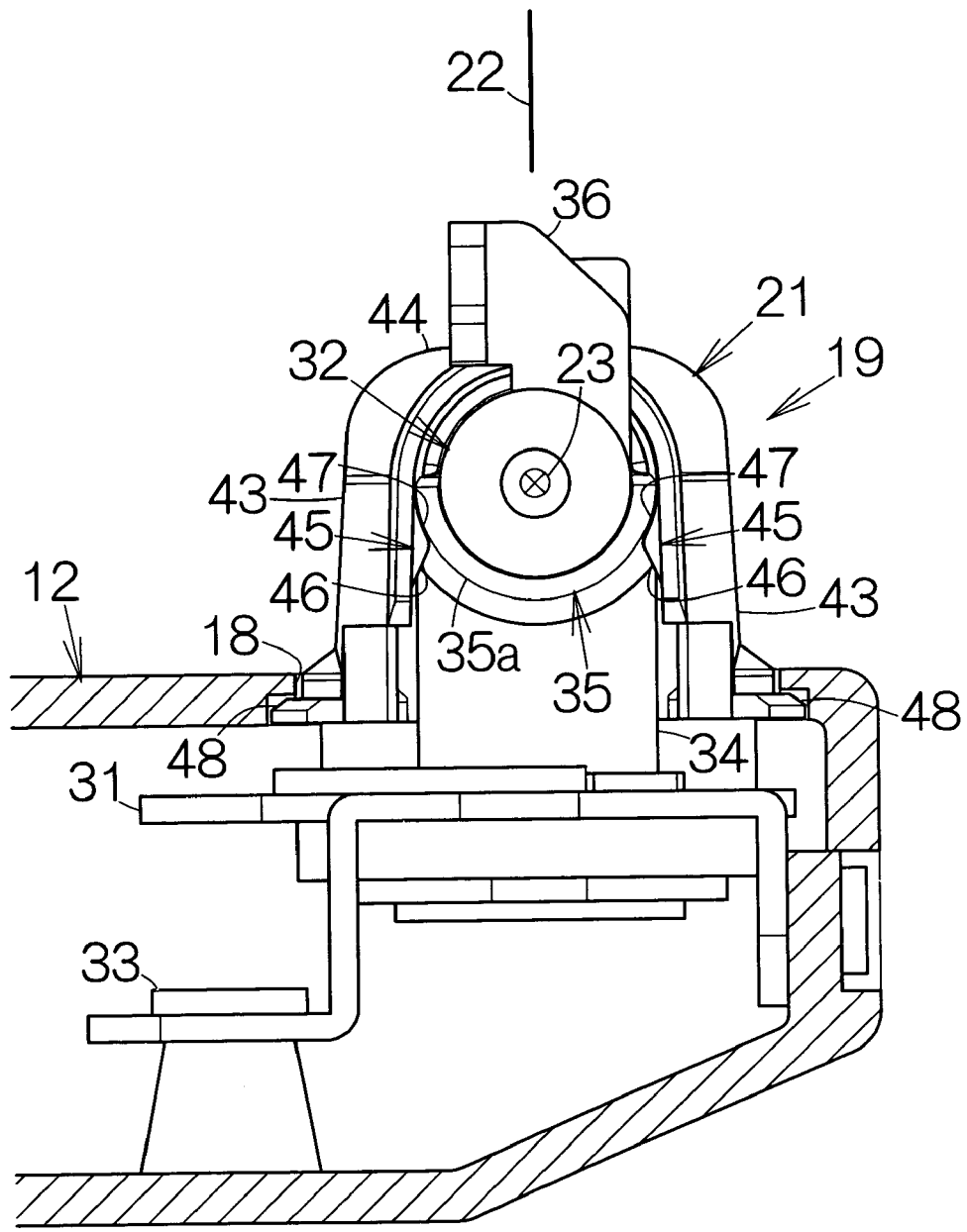
FIG. 7 is an enlarged partial side view schematically illustrating the structure of the swivel mechanism.

The hinge cap 21 includes a pair of side wall 43, 43 holding the main body 34 and the arms 35 therebetween. The upper ends of the side walls 43 are connected to each other through a curved top wall 44. The curved top wall 44 has a predetermined elasticity. As shown in FIG. 7, protrusions 45, 45 are formed on the side walls 43, 43 of the hinge cap 21, respectively. The protrusions 45 are opposed to each other. The protrusions 45 are designed to get in contact with a downward hemicylindrical surfaces 35a formed on the arms 35. The protrusions 45 are engaged with the arms 35 based on the elasticity of the curved top wall 44. The protrusions 45 serve to prevent the hinge cap 21 from dropping off from the rotating member 32.

The protrusions 45, 45 extend in parallel with the vertical axis 22. Each protrusion 45 includes first and second slopes 46, 47 swelling from the side walls 43. The second slope 47 is continuous to the first slope 46. The first slope 46 may be formed in a flat surface, for example. The second slope 47 may be formed in a curved surface corresponding to the hemicylindrical surface 35a of the arm 35. The second slopes 47 are thus allowed to stably hold the arm 35.

When the hinge cap 21 is to be attached, the hinge cap 21 is first seated on the arms 35. The first slopes 46 of the protrusions 45 are received on the upper surfaces of the arms 35. When the hinge cap 21 is then pressed down toward the support member 31, the sliding movement of the first slopes 46 along the corresponding arms 35 serves to distance the protrusions 45 from each other based on the elasticity of the curved top wall 44 until the second slopes 47 reach the hemicylindrical surface 35a. As the second slopes 47 slide along the hemicylindrical surface 35a, the protrusions 45 are allowed to get closer to each other based on the elasticity to restore the original shape of the curved top wall 44. The main body 34 and the arms 35 are in this manner covered with the hinge cap 21.

When the hinge cap 21 is to be detached, the hinge cap 21 is lifted up along the vertical axis 22. The second slopes 47 slide along the hemicylindrical surface 35a, so that the protrusions 45 get distanced from each other based on the elasticity of the curved top wall 44. When the second slopes 47 disengage from the hemicylindrical surface 35a, the protrusions 45 are allowed to get closer to each other based on the elasticity to restore the original shape of the curved top wall 44. The hinge cap 21 is in this manner removed from the rotating member 32.

As is apparent from FIG. 7, the attachment member 31 is completely enclosed within the main body enclosure 12. The rotating member 32 and the hinge cap 21 protrude out of the opening 18 of the main body enclosure 12. Flanges 48 protrude outward from the bottom ends of the hinge cap 21, so that the flanges 48 are opposed to the inside surface of the main body enclosure 12. The flanges 48 are thus engaged with the main body enclosure 12, so that the flanges 48 serve to prevent the hinge cap 21 from removal from the main body enclosure 12.

The elasticity of the curved top wall 44 is utilized to stably hold the hinge cap 21 on the main body 34 and the arms 35 in the notebook personal computer 11. The hinge cap 21 is steady engaged with the main body 34 and the arms 35. Accordingly, when the user carries the notebook personal computer, for example, the hinge cap 21 is reliably prevented from rattling. Generation of noise can be avoided.

Even when the wires 42 exhibit a driving force to push up the hinge cap 21 along the direction of the vertical axis 22, for example, the hinge cap 21 can stably be held on the rotating member 32. The hinge cap 21 is reliably prevented from being lifted up. In addition, the hinge cap 21 is prevented from dropping off from the rotating member 32 when the hinge cap 21 is to be attached during the assembling of the notebook personal computer 11. The notebook personal computer 11 can be assembled in an efficient manner.

The elasticity of the curved top wall 44 enables attachment and detachment of the hinge cap 21 to and from the rotating member 32. Even if the wires 38 suffer from some defect, the hinge cap 21 can easily be detached from the rotating member 32. Repair or exchange of the wires 38 can easily be effected. The first slopes 46 enable a facilitated attachment of the hinges cap 21. The second slopes 47 likewise enable a facilitated detachment of the hinge cap 21.

The electronic apparatus according to the present invention may include, in addition to the aforementioned notebook personal computer 11, a cellular phone terminal, a personal digital assistance (PDA), a tablet personal computer, and the like.

What is claimed is:

1. An electronic apparatus comprising:
   a first enclosure;
   a support member incorporated in the first enclosure;
   a rotating member supported on the support member for relative rotation around a first rotation axis, said rotating member protruding out of an opening defined in the first enclosure;

a second enclosure coupled to the rotating member for relative rotation around a second rotation axis extending along a plane perpendicular to the first rotation axis;

a hinge cap protruding out of the opening so as to cover over the rotating member, said hinge cap having a predetermined elasticity; and a protrusion formed on the hinge cap and engaged with the rotating member based on the elasticity of the hinge cap.

2. The electronic apparatus according to claim 1, further comprising:

a through hole penetrating through the rotating member along the first rotation axis; and a wire located within the through hole, said wire extending from the first enclosure to the second enclosure.

3. A hinge unit comprising:

a support member incorporated within a first enclosure of an electronic apparatus;

a rotating member supported on the support member for relative rotation around a first rotation axis and protruding out of an opening defined in the first enclosure, said rotating member receiving a second enclosure of the electronic apparatus for relative rotation around a second rotation axis extending along a plane perpendicular to the first rotation axis;

a hinge cap protruding out of the opening for covering the rotating member, said hinge cap having a predetermined elasticity; and a protrusion formed on the hinge cap and engaged with the rotating member based on the elasticity of the hinge cap.

4. The hinge unit according to claim 3, wherein said rotating member includes a through hole penetrating through the rotating member along the first rotation axis, said through hole receiving insertion of a wire extending from the first enclosure to the second enclosure.

* * * * *